United States Patent [19]

Barber

[11] Patent Number: 4,691,553

[45] Date of Patent: Sep. 8, 1987

[54] SAFETY POWER TOOL

[76] Inventor: Stephen C. Barber, 18900 Highland Ave., Deephaven, Minn. 55391

[21] Appl. No.: 836,837

[22] Filed: Mar. 6, 1986

[51] Int. Cl.⁴ .............................................. B21J 7/46
[52] U.S. Cl. ....................................... 72/444; 72/441; 72/482; 72/447; 192/130
[58] Field of Search ................ 72/389, 448, 441, 404, 72/481, 413, 414, 442, 319, 320, 482, 447, 444; 192/129 R, 130, 134, 137, 143

[56] References Cited

U.S. PATENT DOCUMENTS

| | | | |
|---|---|---|---|
| 3,681,994 | 8/1972 | Zbornik | 72/389 |
| 4,014,204 | 3/1977 | Hanni et al. | 72/413 |
| 4,148,209 | 4/1978 | Bessho | 72/441 |
| 4,509,357 | 4/1985 | Zbornik | 72/389 |
| 4,550,588 | 11/1985 | Abe et al. | 72/441 |

Primary Examiner—Robert L. Spruill
Assistant Examiner—David B. Jones
Attorney, Agent, or Firm—James V. Harmon

[57] ABSTRACT

A safety power tool is described which is useful as a hardware insertion press. It includes a punch aligned slideably between an anvil and a short stroke power ram adapted to move the punch toward the anvil through a relatively short distance and a spacer movable to an opening between the ram and the punch to contact the ram at one end and the punch at the other end for transmitting the short stroke motion of the ram to the punch. A long stroke retraction actuator is connected to the punch for withdrawing the punch from the anvil when the spacer is moved laterally to an inoperative position to provide a relatively large clearance space between the punch and the anvil but with the spacer out of the way, the ram is rendered ineffective to apply pressure to the punch thereby preventing injuries.

8 Claims, 16 Drawing Figures

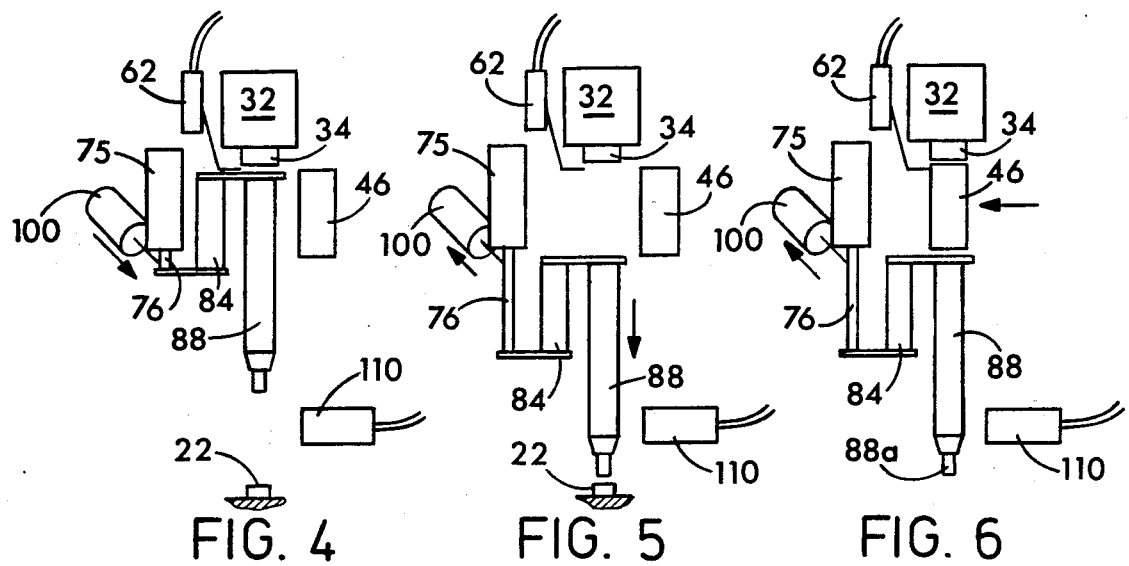
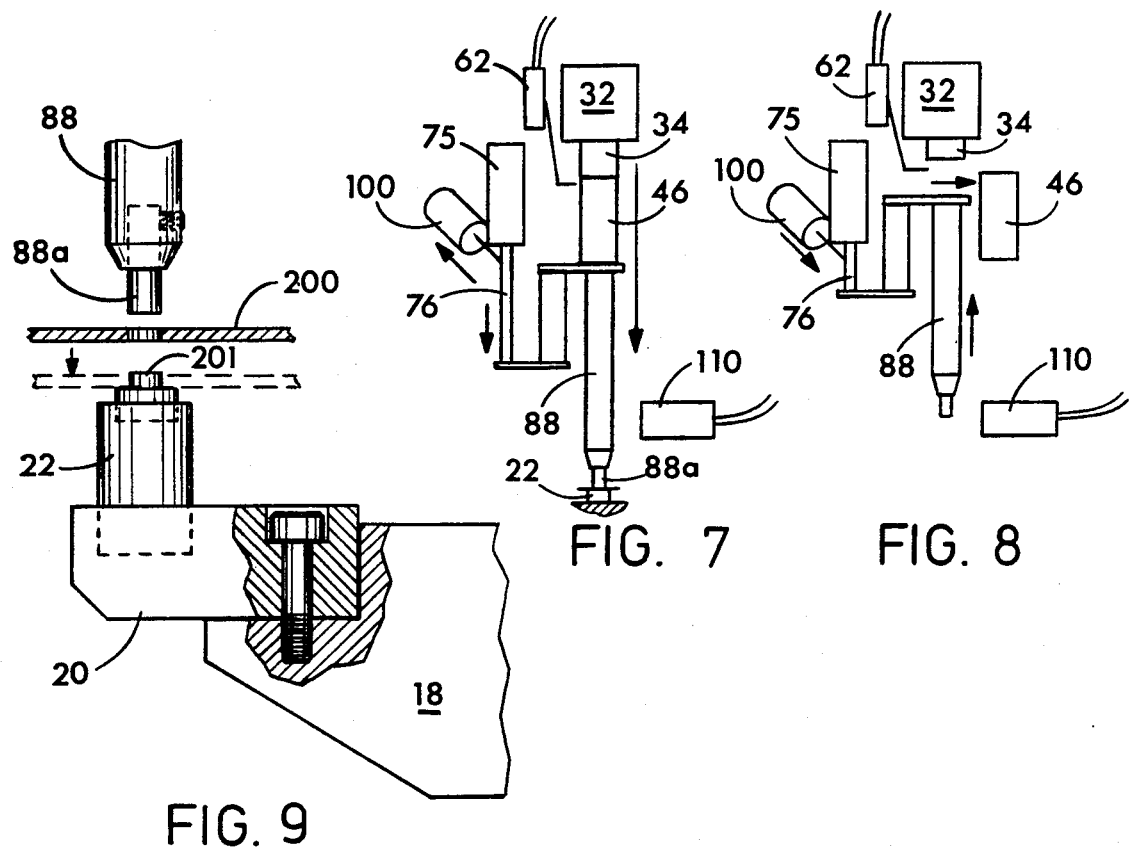

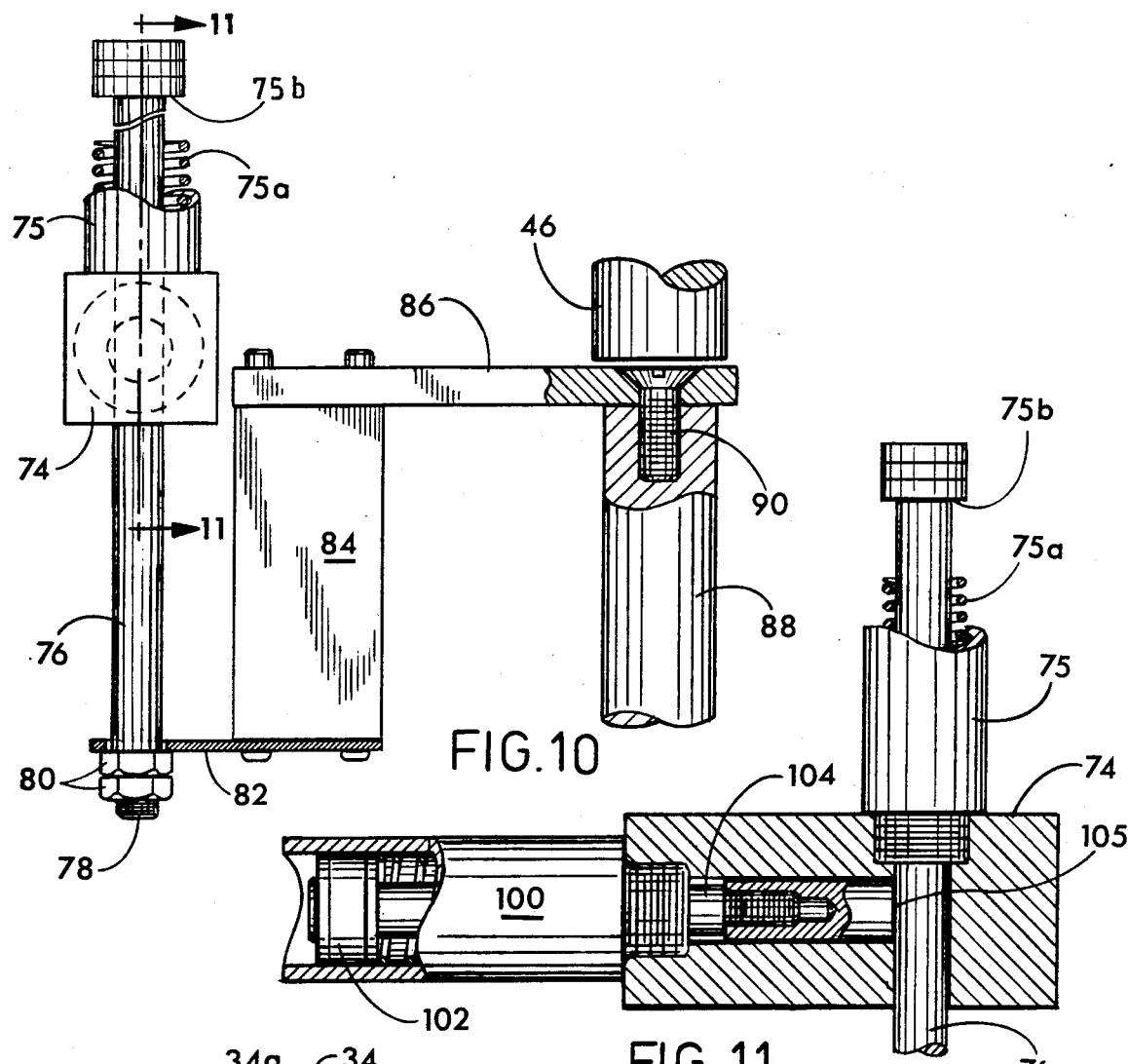
FIG.10
FIG.11
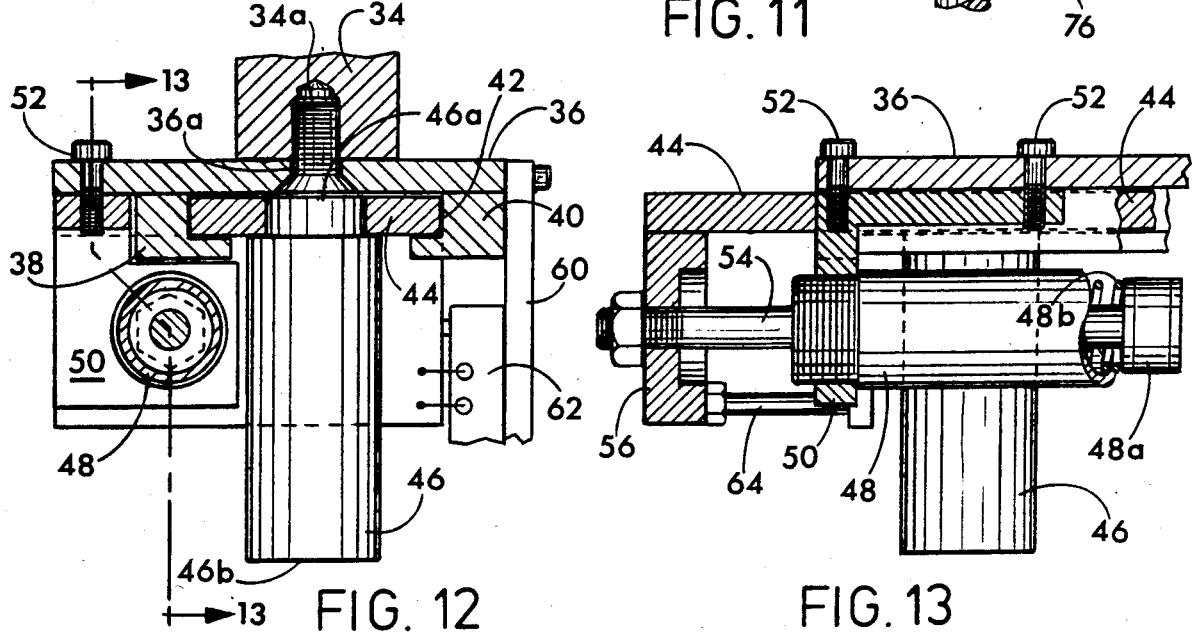
FIG.12
FIG.13

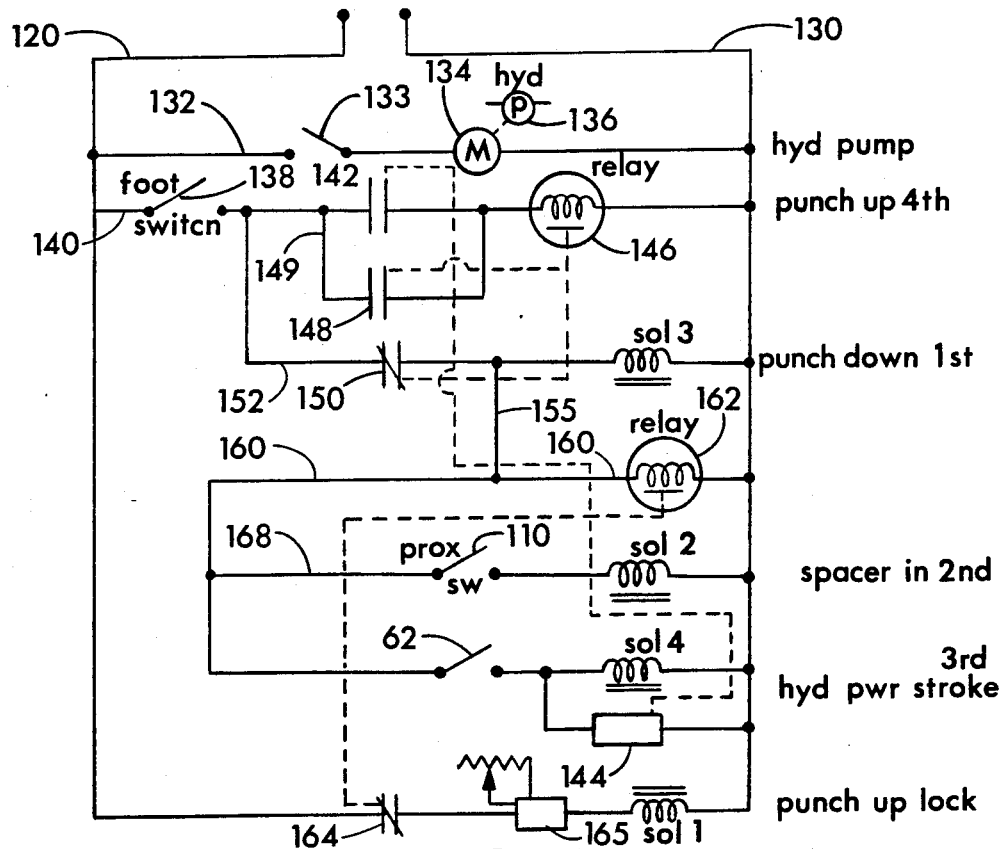
FIG. 14
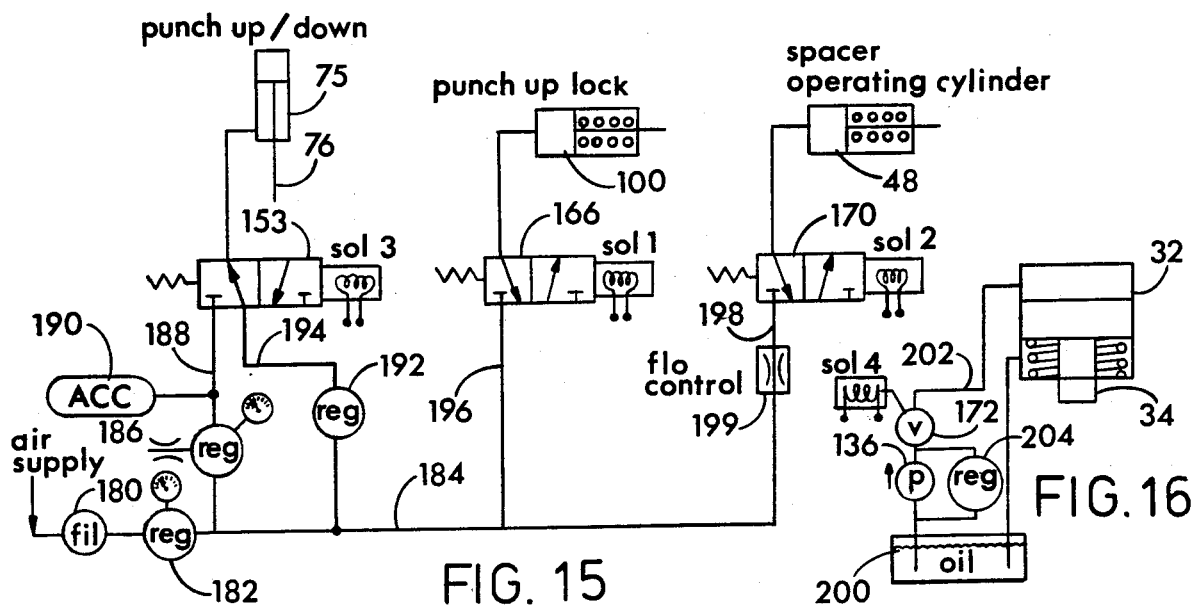
FIG. 15
FIG. 16

SAFETY POWER TOOL

FIELD OF THE INVENTION

The present invention relates to power tools and more particularly to a power tool with a safety feature for protecting the operator and the workpiece. The invention is particularly useful as a hardware insertion press.

BACKGROUND OF THE INVENTION

Power tools used for applying pressure to a workpiece, for example in the insertion of hardware items into sheet material, can be hazardous to the operator and may enable the workpiece to occasionally become bent or otherwise damaged or, in the alternative, have insufficient clearance to allow large sized workpieces to be quickly and easily introduced and removed from the press. Another deficiency results from the large size of the hydraulic ram and associated pumping equipment required for long stroke operation previously used. To overcome these deficiencies, it has been previously proposed to provide various safety features for the prevention of accidents. For example, safety switches are often used to detect the presence of foreign objects or the hands, sometimes with dual operating switches which require the placement of one hand on each switch to operate the press. While this is effective, the hands are unavailable to assist the operation, for example in holding the workpiece at its edges, and it well-known that safety switches are sometimes by-passed or otherwise turned off with some kind of cheating device.

In view of these deficiences of the prior art, it is one object of the invention to provide an improved safety power tool providing ample clearance of several inches for the insertion and removal of the workpieces while benefiting from the use of a short stroke ram with a typical stroke of about 174". Another object is to provide safe operation by providing means which will inherently prevent the application of substantial pressure to objects that are many more that typically 174" in thickness. A further object is to provide a safety power tool suited for use as a hardward insertion press which will travel a major portion, e.g., 75% of its stroke with only a slight pressure such as one pound or less, then travel the remaining fraction of its stroke at a much higher pressure, e.g., 4,000 lbs., so that the possibility of injury is avoided when the punch moves from its open position toward the closed position to a point where it is in contact or almost in contact with the workpiece. It is also an object of the invention to provide a highly effective means for raising the punch quickly to a retracted position and allowing it to fall to an operating position under the influence of gravity as well as for effectively sensing and controlling the motion of moving parts so that the press opering ram will function only when desired to assure safe operation.

SUMMARY OF THE INVENTION

Briefly, the invention provides a safety power tool adapted for use as a hardward insertion press for exerting pressure on a workpiece such as a hardware item that is to pressed into an opening in a piece of sheet metal. The tool includes a punch aligned slideably between an anvil and a short stroke power ram such as a hydraulic or mechanical ram operated, for example, by means of lever or screw action adapted to move the punch toward the anvil through a relatively short distance and a spacer that can be moved into an opening between the ram and the punch so as to contact the ram at one end and the punch at the other end for transmitting the short stroke motion of the ram to the punch. A long stroke actuator means is also provided for sliding the punch away from the anvil when the spacer is moved away from its operating position between the ram and the punch to provide a relatively large clearance space between the punch and the anvil to accommodate and facilitate the introduction and removal of workpieces of various sizes without danger of damaging the workpiece or injuring the operator. A sensor is connected to sense the movement of the punch to its ready position and movement of the spacer to its operating position for safely controlling the actuation of the ram.

These and other more detailed and specific objects of the invention will become apparent in view of the following detailed specification which sets forth the invention by way of example.

THE FIGURES

FIG. 1-8 illustrates successive steps in a cycle of operation of the invention.

FIG. 9 is a partial side elevational view partly in section showing the punch, workpiece and anvil.

FIG. 10 is a partial front elevational view partly in section on a enlarged scale relative to FIG. 2 showing the punch with a spacer above it in the operating position.

FIG. 11 is a vertical sectional view taken on line 11—11 of FIG. 10.

FIG. 12 is an enlarged vertical sectional view taken on line 12—12 of FIG. 2.

FIG. 13 is a vertical sectional view taken on line 13—13 of FIG. 12.

FIG. 14 is a schematic wearing diagram that can be used in accordance with one preferred form of the invention.

FIG. 15 is a pneumatic circuit diagram in accordance with one form of the invention and FIG. 16 is a hydraulic schematic diagram in accordance with one form of the invention.

DETAILED DESCRIPTION

Figure 1:
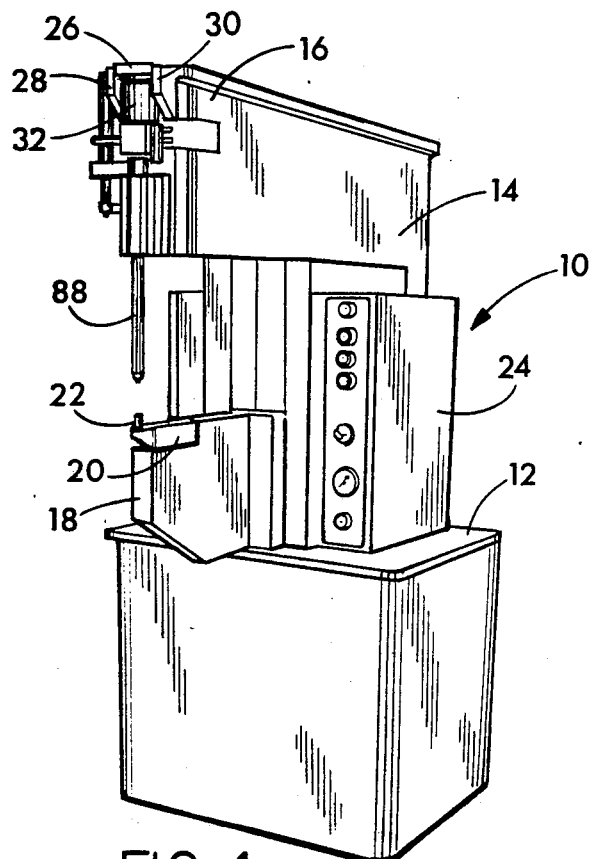
FIG. 1 is a perspective view of the invention.

Shown in FIG. 1 is a safety power tool 10 in accordance with the invention supported upon a base or cabinet 12 and including a main framework 14 having an actuator supporting head 16 that is spaced above a knee 18 upon which is rigidly mounted an anvil supporting horn 20 and an anvil 22.

Operating controls are mounted in a control box 24 at the right side of the machine. The top of the actuator support head 16 comprises a horizontal plate 26 to which are secured rigidly as by welding a pair of laterally spaced apart vertically disposed reinforcing plates 28 and 30 between which is rigidly mounted into vertical position an actuator 32, in this case a hydraulic power actuator of a relatively short stroke such as from about 174" to about one inch. Within the actuator 32 is a usual hydraulic cylinder piston (not shown) to which is secured a hydraulic ram or actuator rod 34 projecting from the bottom of the actuator 32 and mounted therein to slide downwardly when the actuator 32 is operated. The actuator is relatively small in size because, in accordance with the invention, the ram is typically moved a relatively short distance of an inch or less and usually less than 174". An actuator or ram of this kind is much less expensive than one that has a stroke of 5 or 6 inches. The actuator 32 can be supporte by bolts or other fasteners connected to the plate 26. Rigidly mounted upon the actuator ram 34 by means of screw 34a is a spacer slide track or keyway support plate 36 to which are secured guides 38 and 40 (FIG. 12) between which is a way 42 extending laterally into which is slideably mounted a spacer support plate 44 in which a spacer 46 having parallel upper and lower surfaces 46a, 46b is suspended. The extension of ram 34 carries plate 36 and spacer 34 downwardly. The spacer and the support plate 44 are slid laterally to an inoperative position or centrally to an operating position by means of an actuator 48 that is supported on a bracket 50 connected to plate 36 by bolts 52 and having an actuator rod 54 secured to a bracket 56 which is itself rigidly secured as by welding to plate 44. In this way, air pressure applied to the right side of the piston 48a of pneumatic cylinder 48 will drive 48 and the spacer 46 to a lateral inoperative position shown in FIGS. 4, 5 and 8 and a return spring 48b will move plate 44 and the spacer 46 to the operating position of FIGS. 6 and 7. Bolted in a vertical position to the front surface of the plate 36 is a sensor mounting plate 60 which supports the sensor 62 such as a microswitch that is actuated by an operating finger 64 that is supported on the brackets 56 so that when the spacer 46 is in its fully retracted operating position, the finger 64 will actuate microswitch 62.

Figure 3:
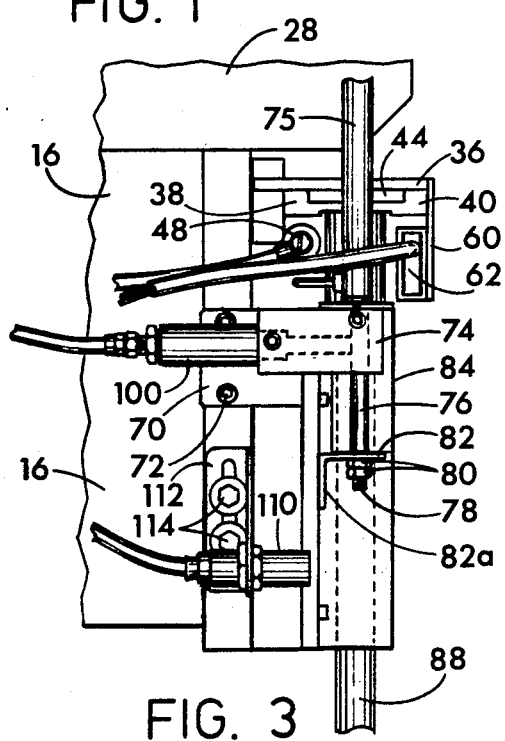
FIG. 3 is a left side elevational view taken on line 3—3 of FIG. 2.
Figure 2:
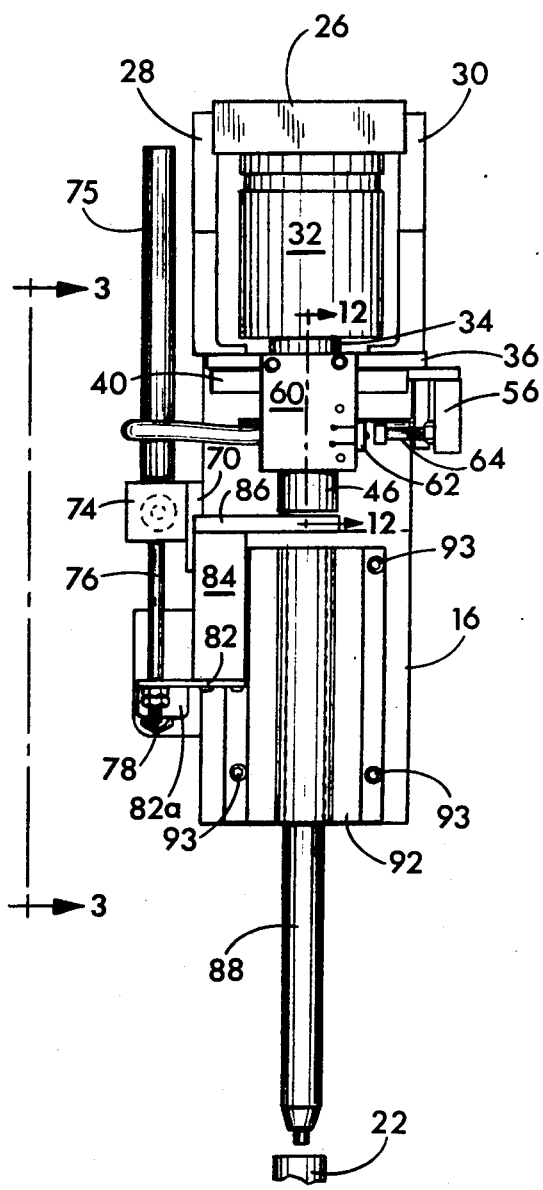
FIG. 2 is a front elevational view of the punch operating mechanism.

The punch retraction assembly will now be described. As shown in FIG. 3, supporting plate 70 is secured rigidly to the actuator support head 16 as by bolts 72 and it, in turn, supports a mounting block 74 having a punch retraction cyclinder 75 extending upwardly therefrom with an actuator rod 76 depending vertically therefrom and slideably mounted through a vertical bore in block 74 with its lower end 78 projecting beneath it, the latter having a stop such as a pair of nuts 80 mounted thereon. The lower end of the rod 76 passes loosely through an opening (not shown) in a plate 82 bolted at the lower end of block 84, the upper end of which is connected by means of plate 86 to the upper end of a punch or punch tool holder 88. As shown in FIG. 10, the punch 88 is secured to the plate 86 by means of flat head screw 90 and is located for vertical sliding motion within a guide 92 in alignment with the ram 34, spacer 46 when the spacer is in its operating position. The guide 92 can be rigidly secured to the actuator support head 16 in any suitable manner as by screws 93. Secured to the rear of the box 74 is a pneumatic cylinder or actuator 100 having a plunger 102 with an actuator rod 104 secured to a break or snubber having a working surface 105 which is forced into frictional contact with the actuator rod 76 when the cylinder 100 is operated to lock the punch in its raised position as will be described below. As shown in FIG. 3, a proximity switch 110 is supported upon a vertically adjustable bracket 112 fixed to the actuator support head 16 by bolts 114 to detect the lowermost or unretracted position of the punch 88. This can be accomplished by placing the proximity switch 110 close to the path taken by a tab 82a attached to the plate 82 so that when the air cylinder 75 allows the punch 88 to be lowered, tab 82a will approach proximity switch 110 to detect the down position of the punch.

By reference to FIG. 9, it will be seen that the punch holder or punch 88 is provided at its lower end with any of a variety of punch tools 88a which, during operation, strike a workpiece of any kind desired. One application to which the invention is particularly well suited is in fastening hardware items to sheet metal such as a sheet 200 provided with a series of bored openings. In this application, various hardware items such as, but not limited to, nuts, bolts, standoffs, studs, posts, threaded nuts and the like are mounted in an opening at the upper end of the anvil 22 with a reduced diameter portion extending upwardly. The sheet 200 is then lowered so that the upwardly projecting portion of the hardware item extends upwardly through the hole in the sheet metal. The punch is then forced downwardly by the ram 34 deflecting its upper edge outwardly over the upper surface of the sheet metal 200 to mount it permanently in the opening. In mounting the fastener 201 or other hardware item, the punch 88 moves only about 174" or less through the action of the ram 34. When the workpiece is to be removed, the spacer 46 is withdrawn allowing the cylinder 75 to elevate the punch 88 several inches, typically 6-8" for the removal of the workpiece.

The cycle of operation can be better understood by reference to FIGS. 4–8. In FIG. 4, the cylinder 75 has elevated the punch 88 to its raised position and the spacer 46 is removed to an inoperative position. In the first step of the operation, air pressure to cylinder 75 is removed allowing the punch 88 to fall under the influence of gravity to a lower ready position spaced about 174" from the anvil 22. The proximity switch 110 senses the lowering of the punch 88 and, through a control system which will be described below, causes the spacer 46 to move toward the left as shown in FIG. 6 into alignment between the ram 34 and the punch 88. The new position of the spacer 46 is detected by the microswitch 62 enabling the ram 34 to descend causing the punch and punch tool 88 to be forced downwardly onto the workpiece supported on the anvil 22 as shown in FIG. 7. A timer which will be described below then allows the spacer 46 to be withdrawn after a predetermined period of time such as 0.75 seconds and the cyclinder 75 starts to raise the punch to its retracted position as shown in FIG. 8.

The "ready" position of the punch 88 prior to the operation of the ram 34 can be controlled by a resilient means such as a stiff 2" spring 75a mounted in the bottom of cyclinder 75 to engage the piston 75b of the cylinder 75 when it is lowered to support the piston and connecting rod 76 as well as the punch 88 in the "ready" position. Fine adjustment of the "ready" position of the punch 88 can be controlled by adjusting the nuts 80 (FIG. 10).

Refer now to FIG. 14 which illustrates an electrical circuit that can be used for controlling the operation of the apparatus. Current is supplied from a power line through conductors 120 and 130 to line 132 having a switch 133 for controlling a motor 134 connected to a hydraulic pump 136 which is also shown in FIG. 16 for supplying fluid under pressure to the actuator 32. A foot switch 138 is connected in a line 140 through a normally open switch contacts 142 which are connected to a timer 144 set to close the contacts 142 after a preset time period such as ¾ of a second following the closing of the microswitch 62 already described. The closing of switch 142 actuates the relay 146 which is connected to close normally open switch 148 and open normally closed switch 150. Switch 148 is wired across switch 142 by conductor 149 and switch 150 is connected via conductor 152 to solenoid 3, also shown in FIG. 15, connected to cylinder 75 allowing the punch 88 to fall and providing current through conductors 155 and 160 to a relay connected to normally closed switch contacts 164 wired across lines 120–130 via adjustable timer 165 through solenoid 1 which is connected to a valve 166 for controlling the air supply to the cylinder 100 for locking the punch 88 and connecting rod 76 in its raised position by applying air pressure behind the piston 102 thereby forcing the end 105 of the connecting rod 104 into frictional engagement with the connecting rod 76. The timer 165 can be set to interrupt the current through solenoid 166 after a period of, say, 10 seconds allowing the rod 76 and the punch 88 to fall again to the "ready" position. The conductor 160 is also connected via line 168 to the proximity switch 110, wired to line 130 through solenoid 2 which is connected as shown in FIG. 15 to a valve 170 to provide air under pressure to spacer operating cylinder 48. Conductor 160 is also wired across the microswitch 62 to the solenoid 4 which is coupled as shown in FIG. 16 to a control valve 172 connected to actuator 32 for lowering the ram 34. The timer 44 is started at the same time solenoid 4 is actuated and, after a selected period of typically $\frac{3}{4}$ seconds, opens switch 142 shutting off the current to relay 146 and thereby closing switch 148 and opening switch 150 whcih allows the major operating components to return to their home or starting position shown in FIG. 4 with the punch 88 elevated.

Refer now to FIG. 15 which illustrates a pneumatic circuit in accordance with one preferred form of the invention. As can be seen, air under pressure is supplied to filter 180 and regulator 182 to a main supply line 184. Pressure is reduced by regulator 186 to a relatively low pressure such as 13 psi in line 188. An accumulator 190 maintains the pressure constant. Air is also supplied through a regulator 192 in line 194 to the solenoid operated valve 153. The accumulator 190 assures a constant 13 psi in line 188 which is slightly less than the combined weight of the punch 88 and associated structue, allowing the punch 188 to drop to the "ready" position without a substantial air pressure change. From line 184 air is supplied through a line 196 to the valve 166 and through line 198 and flow controller 199 to the valve 170.

In FIG. 16 it will be seen that hydraulic fluid is supplied from reservoir 22 through supply line 202 by pump 136 under the control of valve 172 and regulator 204. When no pressure is provided, the ram 34 is raised by a return spring 206.

During operation with current supplied through lines 120, 130, the operator will close the foot switch 138 thereby actuating solenoid 3 allowing connecting rod 76 and punch 88 to fall. The punch then descends until the piston 75b strikes spring 75a placing the punch in the "ready" position which is typically 0.25" from the anvil 22 simultaneously activating the proximity switch 110. If the punch is prevented from descending to the "ready" position, the circuit allows all components to remain on "hold" until the punch completes its descent or the operator takes his foot off the switch 138 and begins the cycle over again. The punch will return to its fully raised position when the foot switch 138 is released. The proximity switch 110 will command the spacer 46 to slide between the punch and the ram by operating the cylinder 48 whereupon the microswitch 62 will be actuated, actuating solenoid 4 to start the ram 34 and timers 144 and 165. The power stroke of the ram will then press the punch against the workpiece. Timer 144 after, say, $\frac{3}{4}$ of a second interrupts the power stroke cycle by closing switch 142 commanding the spacer to retract and the punch to return to its upper position. The timer 165 activates the locking cylinder 100 to control, i.e., shorten, the upward travel of the punch. The travel distance of the punch is determined by the operator adjusting the timing of the timer 165. If the timing is increased, the punch will travel higher between each cycle but the cycle time will normally be longer. To save time, the operator may adjust the timer 165 to cause the punch to be raised a shorter distance when the lock 100 is operated thereby reducing the cycle time and increasing production rates. When the foot switch 138 is released, components will return to their starting positions of FIG. 4, resetting the machine for the next operating cycle.

What is claimed is:

1. A safety power tool for exerting pressure on a work piece comprising,
a supporting framework having an anvil and a short stroke power ram mounted upon said framework,
a punch supported upon the tool and aligned slideably between the anvil and the short storke power ram, said ram being adapted when extended to move the punch toward the anvil through a relatively short distance, a spacer movable into an opening between the ram and the punch to contact the ram at one end and the punch at the other end when the ram is operated for transmitting the short stroke motion of the ram to the punch and a long stroke retraction actuator for withdrawing the punch from the anvil when the spacer is removed from between the ram and the punch to provide a relatively large cleared space between the punch and the anvil for accommodating and facilitating the introduction and removal of work pieces of various sizes without danger of injury to an operator, said retraction actuator elevating the punch into the space formerly occupied by the spacer when the spacer is in an inoperative position and a lock means mounted upon said apparatus in operative association with said punch, said lock means locking the punch in a fixed position after the punch has been elevated, a timer operatively connected to said lock for energizing the lock so as to halt the motion of the punch after the retraction actuator has raised the punch a predetermined period of time, thereby controlling the height to which the punch is raised when the motion is interrupted by the lock to control the clearance space between the anvil and the punch.

2. The tool of claim 1 wherein the retraction actuator is a fluid operated cylinder operatively connected to the punch for raising and lowering the punch, said cylinder is connected to a supporting member, said lock comprises a fluid operated cylinder connected to said supporting member and having a break surface adapted to frictionally engage a connecting rod extending from the retraction actuator through the supporting member.

3. The tool of claim 1 wherein a sensor means is operatively associated with the punch to sense the lowering of the punch to a "ready" position taken by the punch when the punch is lowered by the retraction actuator and said sensor is operatively connected to thereupon cause the spacer to be moved to its aligned operative position.

4. The tool according to claim 3 wherein a second sensor is mounted upon the tool in position for sensing the movement of the spacer to its operative position aligned between the anvil and the ram and said second sensor is operatively associated with the ram for actuating the ram to thereby move the ram, the spacer and the punch through a relatively short stroke to apply pressure to the workpiece.

5. A hardware insertion press comprising a supporting framework having a base, and at the upper end thereof, an actuator support head, said press being adapted to exert pressure upon a workpiece for the insertion of a hardware item into sheet material, a punch mounted upon the press aligned slideably between an anvil supported at the lower end of the framework and a short stroke power exerting ram means adapted to move the punch toward the anvil through a relatively short power stroke, and ram having a free end and a spacer movably mounted on the free end of the ram for movement toward and away from an opening between the ram and the punch, said spacer being adapted to contact the ram at one end and the punch at the other end when in alignment therebetween to transmit the short stroke motion of the ram to the punch, actuator means operatively connected to the spacer for moving the spacer to its operative position when the punch is moved away from the ram to a ready position and a means for withdrawing the punch from the anvil into the space formerly occupied by the spacer when the spacer is removed from between the ram and the punch to provide a relatively large clearance space when the ram is not being operated, a first timing means is provided on the press for moving the spacer to the operative position when the punch has been moved away from the ram to the ready position and a second timing means is operatively connected to the ram for actuating the ram for a selected period of time and for thereafter simultaneously deactivating the ram thereby causing the ram to be retracted, for moving the spacer laterally to its inoperative position, and for sliding the punch over a relatively long stroke distance toward the ram into the space formerly occupied by the spacer to prepare for the next cycle of operation.

6. The apparatus of claim 5 wherein a brake means is mounted on the apparatus in position to engage the punch, said second timing means is connected to the brake means to halt the motion of the punch at a time determined by the second timing means as the punch is being retracted, whereby an operator can regulate the second timing means to control the time interval during the punch is being retracted to thereby determine the clearance between the anvil and the punch when the punch is halted by the brake and thereby fully retracted.

7. The apparatus of claim 6 wherein a first sensor is provided on the press to sense the movement of the punch to the ready position and is operatively associated with the spacer for moving the spacer to its operative position aligned between the punch and the ram and a second sensor is operatively associated with the spacer to sense the alignment of the spacer between the ram and the punch, said second sensor is operatively associated with the ram to actuate and thereby extend the ram forcing the spacer into engagement with the punch to apply pressure to the workpiece.

8. A safety power tool for exerting pressure on a workpiece while protecting the fingers of an operator, said tool comprising a supporting framework having a short stroke a ram at its upper end said short stroke ram having a stroke of a fraction of an inch or less, a punch mounted upon said framework and aligned below the ram for long stroke sliding motion toward and away from the ram in the direction of an anvil positioned beneath it, means for transmitting short stroke motion of the ram to the punch at selected times so that when the ram operates, the punch moves less than the thickness of the fingers of an operator, and said means being adapted to be rendered inactive at times allowing retraction of the punch toward the ram a distance of several inches for insertion of the workpiece and the punch being allowed descend from its retracted position to a ready position while the ram is thus rendered inactive, said ram and punch being operatively associated such that when said means is rendered inactive, movement of the ram is not imparted to the punch, means is provided to supply a supporting force to the punch partially supporting the punch as the punch descends from a retracted position to a ready position to effectively reduce the force that the punch can apply against any foreign object as the punch descends toward its ready position whereby the weight of the punch minus the supporting force will be allowed to fall against any object beneath it as the punch descends to its ready position thereby preventing injury to an operator or damage to a workpiece caused by inadvertent or premature operation of the ram.

* * * * *